United States Patent [19]

Rabideau

[11] Patent Number: 5,394,636
[45] Date of Patent: Mar. 7, 1995

[54] COMBINATION JIG AND SPINNER LURE

[76] Inventor: Phillip A. Rabideau, 3605 Fawn Creek, Austin, Tex. 78746

[21] Appl. No.: 231,246

[22] Filed: Apr. 22, 1994

[51] Int. Cl.⁶ .............................................. A01K 85/00
[52] U.S. Cl. .................................................... 43/42.13
[58] Field of Search ................ 43/42.13, 42.14, 42.11, 43/42.16, 42.39, 42.19, 42.47

[56] References Cited

U.S. PATENT DOCUMENTS

| | | | |
|---|---|---|---|
| 3,546,804 | 12/1970 | Woolums | 43/42.11 |
| 4,640,041 | 2/1987 | Stanley | 43/42.13 |
| 4,718,191 | 1/1988 | Gentry | 43/42.13 |
| 4,745,700 | 5/1988 | Davis | 43/42.11 |
| 4,888,908 | 12/1989 | Morris | 43/42.14 |
| 5,136,801 | 8/1992 | Pond | 43/42.39 |
| 5,175,955 | 1/1993 | Wilson et al. | 43/42.39 |
| 5,226,268 | 7/1993 | Sisson, Jr. | 43/42.13 |

OTHER PUBLICATIONS

Catalog of Betts Tackle Ltd. (18 pages).
Catalog of Heluva Jig (4 pages).
Apex Quality Fishing Tackle 1993 Product Catalog (24 pages).
Illustrations from the Cabello's Spring, 1994 Catalog (1 page).

Primary Examiner—P. Austin Bradley
Assistant Examiner—Chuck Y. Mah
Attorney, Agent, or Firm—Shaffer & Culbertson

[57] ABSTRACT

A combination jig and spinner fishing lure is described that combines the benefits of both spinners and jigs. The present invention discloses a spinner jig having generally a jig head (10), a hook (35), a spinner arm (24), a swivel linkage (32), a spinner blade (20), and a hook dressing (40). The hook (35) and spinner arm (24) firmly attached to the jig head (10) so that motion of the swivel linkage (32) and spinner blade (20) are limited and so that the spinner blade is closely coupled to the hook (35) and jig head (10). The shape of the jig head (10) prevents the spinner blade (20) from being drawn to the surface of the jig head while the swivel linkage (32) causes the spinner blade (20) to rotate on a substantially fixed axis. A fishing line attaches to the spinner arm (24) at an attachment location (27) that preferably lies along the axis upon which the spinner blade (20) rotates. The construction of the spinner jig allows the spinner blade (20) to rotate both during rising and falling motions and prevents the spinner blade from being drawn to the jig head (10) by the Venturi effect.

16 Claims, 1 Drawing Sheet

U.S. Patent  Mar. 7, 1995  5,394,636
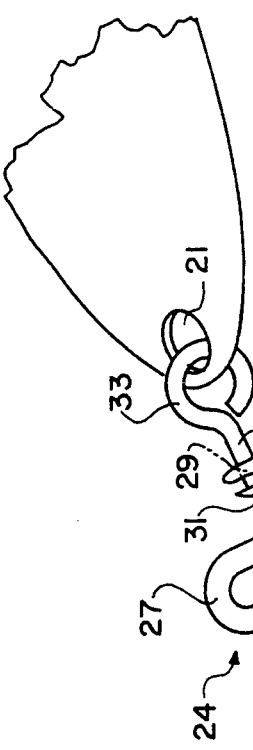
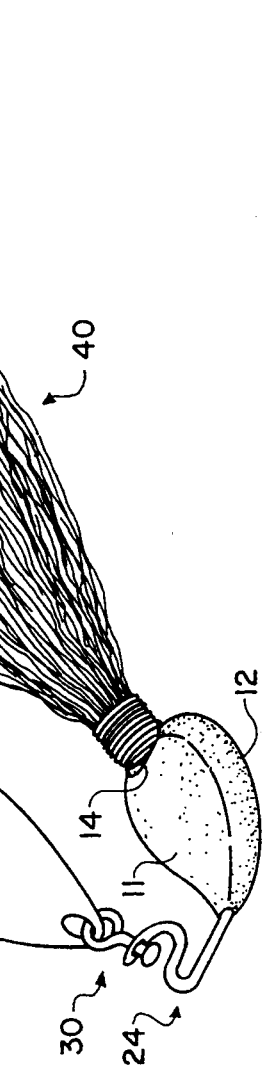
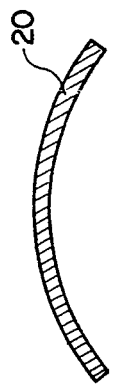
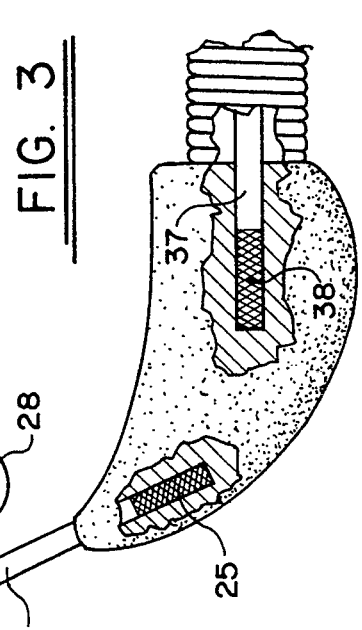

COMBINATION JIG AND SPINNER LURE

BACKGROUND OF THE INVENTION

This invention relates to fishing lures. More particularly, this invention relates to a combination jig and spinner lure designed so that the spinner rotates both when the lure is retrieved and when it is allowed to sink in the water.

A wide variety of artificial lures are available to the sports fisherman. One common form of artificial fishing lure is known as a "jig". In its simplest form, a jig is the combination of a hook and a weighted jig head, the weighted jig head being constructed of a heavy material such as lead. Generally, a portion of the hook's thank passes through the jig head so that the eye of the hook protrudes from one portion of the jig head and the remainder of the hook's shank extends from another portion of the jig head. In order to attract more fish, the jig head is usually painted and the hook shank is generally adorned with a dressing such as hair, rubber or plastic skirt.

Weighted jig heads and hooks come in a variety of shapes to suit the intended function of the jig. One common jig configuration includes a ball shaped weighted jig head and a hook with a ninety degree bend in the hook shank just below the hook eye. Typically, the shank is bent such that the hook eye resides on the same side of the shank as the hook point and such that the hook resides substantially in a single plane. The jig head attaches to the hook so that the shank of the hook exits a posterior section of the round jig head and the book eye protrudes from an upper portion of the round jig head. This type of jig is typically used when fishing in deep water near the bottom with the jig being moved up and down in a vertical fashion to attract fish.

Another type of jig includes a weighted jig head that is elongated in shape and used in conjunction with a hook having a straight shank. The jig head connects to the hook shank in a manner so that the hook eye extends from an anterior portion of the jig head while the hook shank extends from a posterior portion along a common axis. Fisherman use this type of jig in a casting and retrieving mode wherein, during the retrieving mode, the fisherman intermittently retrieves the jig and allows the jig to sink in the water so that the jig travels in a sawtooth fashion on or near the bottom.

Another common form of fishing lure is known as a "spinner". A spinner includes a generally oval, metal blade with a convex surface, commonly called a spinner blade, attached to a wire shaft via a clevis. A fishing line attaches to a shaft eye located at a first end of the wire shaft while a hook assembly attaches to a second end of the wire shaft opposite the first end. When the spinner is retrieved through the water, the blade rotates about the wire shaft in a conical pattern. The rotation of the spinner blade attracts fish with the fish engaging the hook instead of the spinner blade. Individual spinner blades can also be attached to other lures to attract fish. Typically, a spinner blade attaches to the lure via a barrel or crane swivel and will function satisfactorily if the spinner blade have enough free space within which to rotate.

Heretofore, jigs and spinners have not been combined satisfactorily. To achieve maximum benefit from adding a spinner blade to a jig, the spinner blade must be closely coupled with the hook. Close coupling exists when the blade spins directly in front of or such that it passes between the hook point and the hook shank during a portion of its rotation. Such close coupling increase the chances of hooking a fish that strikes and engulfs the spinner blade. Due to the nature of the methods used in fishing with a jig, further benefit would be derived if the spinner blade rotated both while the jig was allowed to descend in the water and when the jig was retrieved upwardly or horizontally.

An inherent problem with closely coupling a spinner blade to a jig adjacent the hook point relates to the water flow around the jig head itself. Because of the shape of a typical jig head, water flow velocity is greatest near the surface of the jig head. Therefore, a decreased water pressure is created at the surface of the jig head, this negative pressure attracting the spinner blade to the jig head. This water velocity/pressure phenomenon is called the "Venturi" principle. When a normal linkage is used to connect a spinner blade to the top-front of a jig head, the reduced water pressure at the surface of the jig head attracts the spinner blade and prevents the spinner from rotating.

Certain prior devices attempted to combine the benefits of spinners and jigs. One particular lure connected a spinner blade to the jig's weighted jig head opposite the hook point so that when the lure was retrieved, the spinner resided underneath the jig head with the jig head and hook above. In this configuration, gravity kept the spinner away from the jig head, and the spinner blade would spin on a straight retrieve, but not when the lure was allowed to sink in the water. Further, in this configuration, the spinner blade was in a position to collect weeds and other bottom trash as it passed near the bottom.

Another prior lure attempted to closely couple a spinner blade with a jig. This lure included a jig with a straight hook shaft, an elongated jig head connected to the hook shaft, and a hook eye located along the hook's shaft axis. A bracket was employed to provide an offset mounting location for the spinner blade so that it was closely coupled to the hook point. With this lure however, because of the jig head's shape and because the line was attached to the lure at a point along the hook's shaft axis, the blade's weight and the Venturi effect at the jig head surface caused the blade to contact the jig head upon retrieval and thereby prevented the spinner blade from properly spinning during retrieval. The spinner blade therefore spun only while the lure was sinking.

SUMMARY OF THE INVENTION

It is therefore a general object of the invention to overcome the above described limitations and others of the prior combination jig and spinner lures.

To accomplish these objectives, a combination jig and spinner fishing lure, a "spinner jig", comprises generally a weighted jig head, a hook, a spinner arm, and a spinner. The components are constructed and connected in a unique manner, described more fully hereafter, so that the spinner is closely coupled to the hook and the jig head but so that the spinner rotates both when the lure descends in the water and when the lure is retrieved.

The weighted jig head, preferably formed of a heavy material such as lead, has a convex bottom surface and a inwardly curved top surface. A shank end of the hook firmly attaches to a posterior portion of the jig head. The hook is fixed with respect to the jig head so that the hook's point is located adjacent the inwardly curved top surface of the jig head and pointing toward the anterior end of the jig head. Constructed in this manner, the spinner jig preferably rests upon its convex bottom surface. Therefore, when a user jigs with the spinner jig, the point remains upright when the lure sits on the bottom between upward tugs and the likelihood of hooking a striking fish is increased.

The spinner arm, firmly attached to an anterior portion of the jig head at an angle with respect to the hook shank, provides a connection that is fixed with respect to the jig head and to which a swivel linkage attaches. The spinner blade connects to a specially designed swivel linkage that reduces the lateral movement of a connected spinner blade. The spinner blade rotates about a spinner axis that extends through the second end of the spinner arm. Preferably, the spinner axis is substantially parallel to the hook shank and lies at least as close to the hook shank as does the hook point. In this fashion, the spinner blade is closely coupled to the hook point.

Preferably, the spinner arm and the hook lie on a common plane and the line attachment location of the spinner arm lies on the spinner axis. This alignment of forces acting on the lure causes the lure to travel through the water in a desired posture during retrieval and maintains the close coupling of the spinner blade to the jig head and hook point.

The inwardly curved top surface of the jig head helps obviate the Venturi effect along the top surface of the jig head near the closely coupled spinner blade. Because water is necessarily moving at the same speed or more slowly along the inwardly curved top surface of the jig head as compared to that of the surrounding water, the pressure at the top surface of the jig head is the stone or greater than that of the surrounding water, and the spinner blade is not attracted to the jig head. Therefore, in combination, the spinner arm, the swivel linkage, and the jig head shape of the present invention work in unison to prevent the spinner blade from being drawn to the jig head either during the spinner jig's descent or retrieval.

The selection of a proper spinner blade is also required. Three basic types of spinner blades are currently used. A first type, the "Colorado" spinner blade, spins at an angle of almost ninety degrees from its axis of rotation. A second types the "willow-leaf" spinner blade, spins very close to its axis of rotation. Finally, a third type, the "Indiana" spinner blade spins a medium distance from its axis of rotation.

By using a spinner blade that is similar to the conventional Indiana spinner in combination with the unique swivel linkage of the present invention, the blade spins in front of the hook point along a spinner axis as the jig moves horizontally through the water. Preferably, the spinner axis components of the spinner jig are assembled so that the spinner axis lies near the jig head so that the spinner blade is closely coupled to the jig head and hook point. In combination, the components of the spinner jig allow the spinner blade to spin as the spinner jig descends through the water as well as when the spinner jig is retrieved through the water.

These and other objects, advantages, and features of the invention will be apparent from the following description of the preferred embodiment, considered along with the accompanying drawings.

BRIEF DESCRIPTION OF THE DRAWINGS

FIG. 1 is a mostly diagrammatic perspective view of a spinner jig incorporating the principles of the present invention.

FIG. 2 is a side elevational view of the spinner jig of FIG. 1 in a horizontal retrieval position with a hook dressing partially cut away to show the hook.

FIG. 3 is a partial side elevational view detailing the jig head, and connections made thereto, with the jig head partially cut away to show the connections.

FIG. 4 is a transverse sectional view taken along line 4—4 in FIG. 2 to detail the shape of a spinner blade.

DESCRIPTION OF THE PREFERRED EMBODIMENT

A spinner jig embodying the principles of the present invention is shown by way of illustration in FIGS. 1-4. Referring to FIGS. 1 and 2, the spinner jig comprises generally a weighted jig head 10, a spinner blade 20, a spinner arm 24, a swivel linkage 30, and a hook 35. The spinner jig may also include a hook dressing 40 for camouflaging the hook 35.

The jig head 10 preferably is molded from-lead or another heavy material such that, when viewed from above, it has a general heart-like shape. An indented portion 14 formed in the end of the jig head 10 accommodates an end of the hook dressing 40. The jig head 10 preferably is formed so that it has a inwardly curved top surface 11, a convex curved and rounded bottom surface 12, and a pointed front end 13. The inwardly curved top surface 11 provides a mechanism to help obviate the Venturi effect from occurring near the jig head adjacent the closely coupled spinner blade 20. The curved bottom surface 12 provides an appropriate shape to allow the spinner jig to sit upright on the bottom of a body of water during use. The pointed front end 13 not only accommodates and anchors the spinner arm 24, but provides streamlining for the spinner jig to pass between and over obstacles.

The hook 35 preferably lies in a hook plane and includes a point 36, a central portion forming a general U-shape, and a shank 37 that lies substantially along a hook shank axis. A shank end 38 of the hook 35 attaches firmly to a posterior portion of the jig head 10. Preferably, the shank end 38 is knurled for enhanced holding power and cast into the jig head 10 or otherwise cemented in place. The firm attachment of the hook 35 to the jig head 10 ensures that the position of the hook point will remain fixed with respect to the jig head.

Still referring to FIGS. 1 and 2, the dressing 40 is preferably formed of multiple strands of hair and firmly attached to the jig head 10 and the book shank 37 by a thread wrapping 41. The dressing 40 may also be constructed in strips from a variety of other materials such as rubber, plastic, metal foil, or the like. The dressing 40 could also be a conventional plastic curly tail or grub routinely used by a fisherman.

The spinner arm 24 is critical to the functioning of the spinner jig and is shown in detail in FIG. 3. The spinner arm 24 preferably lies in the look plane and is formed from a brass or stainless steel wire. In a preferred embodiment, the spinner arm 24 is formed in a general "S" configuration. The spinner arm 24 includes a first end. 25 firmly attached to an anterior portion of the jig head 10 and extending from the jig head at an angle with respect to the hook shank 37. The spinner arm 24 further includes a straight portion 26, a line attachment location 27, a rear section 28, and a second end preferably formed into a linkage hole 29 for receiving the swivel linkage 30. The multi-functional spinner arm 24 not only provides an appropriate place for securing the fishing line, but rigidly maintains the linkage hole 29 in an exact position with respect to both the jig head 10 and the hook 35. As one skilled in the art will readily appreciate, the spinner arm 24 and hook 35 could be singly formed from a single portion of metal. Such a single piece structure would add strength to the spinner jig if such added strength was needed.

Preferably, as shown in the FIGURES, the spinner arm 24 lies on the same side of the jig head 10 as does the hook point 36. This structure is defined such that the spinner arm 24 lies on a same side of a jig head plane as the hook point 36. The jig head plane lies perpendicular to the hook plane and converges with the hook plane along the hook shank axis. In this fashion, the spinner arm 24 connects to the jig head 10 on the same side of the jig head as the hook point 36 so that the force applied by an attached fishing line causes the hook point to follow the spinner arm directly thereby preventing fouling of the hook 35.

The swivel linkage 30 preferably is made from a round metal wire constructed of brass, stainless steel, or the like. The swivel linkage 30 includes a straight shaft portion 32 that fits into the linkage hole 29 of the spinner arm 24 with close tolerances. The swivel linkage 30 also includes a swaged head 31 located at a first end of the linkage, the swaged head having a diameter larger than the diameter of the linkage hole 29 to hold the swivel linkage in place. An eye 33 having a substantially circular shape is formed at a second end of the swivel linkage 30, the eye closed on a hole 21 in the spinner blade 20. The swivel linkage 30 with its connection to the spinner arm 24 holds the spinner blade 20 in a precise relationship with respect to the jig head 10 and hook 35.

The spinner blade 20 preferably rotates about a spinner axis that passes through the linkage hole 29 of the spinner arm 24 and in a conical pattern that passes near the curved top surface 11 of the jig head 10. Preferably, the line attachment location 27 also lies on the spinner axis so that the force provided by a fishing line acts along the spinner axis. Further, to provide close coupling of the spinner blade 20 to the jig head 11 and hook point 36, the linkage hole 29 preferably lies between the hook shank axis and a hook point axis that is parallel to the hook shank axis and extends through the hook point. In this fashion, the spinner blade 20 is closely coupled to the jig head 10 and the hook point 36.

Preferably, an "Indiana" type spinner blade is selected having the proper characteristics as described above. FIG. 4 details a cross-section of the spinner blade 20 provided in the current invention. Of course, one skilled in the art will appreciate that the desired cross-sectional curvature of the spinner blade 20 will vary depending on the thickness of the blade, the density of the blade, the length of the blade, and the desired radius of spin of the blade. When properly selected, the spinner blade 20 spins in front of, and preferably around, the hook point as the jig moves through the water. The unique design of the spinner jig of the present invention allows the splinter blade 20 to spin as the spinner jig drops in the water during its descent as well as when it is retrieved in a vertical or horizontal fashion.

The present invention also includes a preferred construction of the jig head 10. Preferably, the jig head's 10 largest dimension perpendicular to the hook plane exceeds its largest dimension perpendicular to the spinner axis on the hook plane. This construction causes the spinner jig to rest in an upright position on a lake bottom when at rest and also provides sufficient space within which the spinner blade 20 may rotate. Prior combination jig and spinner lures rested on their sides.

Referring particularly to FIG. 2, in use, a fisherman attaches a fishing line to the line attachment location 27 on the spinner arm 24. The fisherman casts the spinner jig or merely allows it to sink into the water. Then the fisherman either moves the spinner jig up and down in the water or retrieves the spinner jig in a sawtooth fashion. In either case, the spinner blade 20 rotates whenever the spinner jig is move in the water thereby attracting fish. When a fish strikes the spinner jig, the spinner blade 20 moves aside to allow the hook 35 to hook the fish. The fisherman then retrieves the spinner jig with the fish attached.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. A combination jig and spinner fishing lure comprising:
   (a) a weighted jig head having a convex curved bottom surface and a inwardly curved top surface;
   (b) a hook that is fixed with respect to the jig head, the hook having a point located adjacent the inwardly curved top surface of the jig head, a central portion forming a u-shape, a shank that firmly attaches to a posterior portion of the jig head;
   (c) a spinner arm fixed with respect to the jig head and having a first end connected to an anterior portion of the jig head, a line attachment location for attaching to a fishing line, and a second end for receiving a swivel linkage, the line attachment location, the second end of the spinner arm, and the hook point all lying substantially on a spinner axis;
   (d) a swivel linkage attached at a first end to the second end of the spinner arm and having a second end that is rotatable on the spinner axis; and
   (e) a spinner blade connected at a first end to the second end of the swivel linkage, the spinner blade rotatable about the spinner axis and adjacent the inwardly curved top surface of the jig head, the first end of the spinner blade rotatable substantially on the spinner axis and the second end of the spinner blade rotatable about the spinner axis.

2. The lure of claim 1 wherein the shank of the hook extends into the jig head and attaches to the first end of the spinner arm.

3. The lure of claim 1 wherein:
   (a) the spinner arm lies substantially on a hook plane, the hook's point, the hook's central portion, and the hook's shank all lying substantially on the hook plane; and
   (b) the second end of the spinner arm lies between a hook shank axis disposed substantially along the hook shank and a hook point axis that is parallel to the hook shank axis and extends through the hook point.

4. The lure of claim 3 wherein the spinner axis is substantially parallel to the hook shank axis.

5. The lure of claim 1 wherein the jig head's largest dimension perpendicular to the hook plane exceeds the jig head's largest dimension perpendicular to the hook shank axis on the hook plane.

6. The lure of claim 1 wherein the first end of the spinner arm attaches to the jig head at an angle with respect to the hook shank axis.

7. The lure of claim 1 wherein the swivel linkage comprises:
   (a) a straight shaft portion extending substantially along the spinner axis through a linkage hole formed in the second end of the spinner arm;
   (b) a swaged head formed at the first end of the swivel linkage having a diameter larger than the linkage hole; and
   (c) an eye formed in a substantially circular shape at the second end of the swivel linkage for connecting to the spinner blade.

8. The lure of claim 1 wherein both the first and second swivel ends are rotatably fixed substantially on the spinner axis.

9. A combination jig and spinner fishing lure comprising:
   (a) a weighted jig head having a convex curved bottom surface and a inwardly curved top surface;
   (b) a hook that is fixed with respect to the jig head, the hook having a point located adjacent the inwardly curved top surface of the jig head, a central portion forming a u-shape, and a substantially straight shank that firmly attaches to a posterior portion of the jig head, the point, the central portion, and the shank all lying substantially on a hook plane, the hook shank also lying substantially along a hook shank axis that defines a convergence line between the hook plane and a jig head plane, the jig head plane being perpendicular to the hook plane;
   (c) a spinner arm lying substantially on the hook plane, fixed with respect to the jig head, and residing on a same side of the jig head plane as the hook point, the spinner arm having a first end firmly connected to an anterior portion of the jig head, a central section for attaching to a fishing line, and a second end for receiving a swivel linkage, the line attachment location, the second end of the spinner arm, and the hook point all lying substantially on a spinner axis;
   (d) a swivel linkage attached at a first end to the second end of the spinner arm and having a second end that is rotatable on the spinner axis; and
   (e) a spinner blade connected at a first end to the second end of the swivel linkage, the spinner blade rotatable about the spinner axis and adjacent the inwardly curved top surface of the jig head, the first end of the spinner blade rotatable substantially on the spinner axis and the second end of the spinner blade rotatable about the spinner axis.

10. The lure of claim 9 wherein the shank of the hook extends into the jig head and attaches to the first end of the spinner arm.

11. The lure of claim 9 wherein:
    (a) the spinner arm lies substantially on the hook plane; and
    (b) the second end of the spinner arm lies between the hook shank axis and a hook point axis that is parallel to the hook shank axis and extends through the hook point.

12. The lure of claim 11 wherein the spinner axis is substantially parallel to the hook shank axis.

13. The lure of claim 9 wherein the jig head's largest dimension perpendicular to the hook plane exceeds the jig head's largest dimension perpendicular to the hook shank axis on the hook plane.

14. The lure of claim 9 wherein the first end of the spinner arm attaches to the jig head at an angle with respect to the hook shank.

15. The lure of claim 9 wherein the swivel linkage is formed from an elongated shaft and comprises:
    (a) a straight shaft portion extending substantially along the spinner axis through a linkage hole formed in the second end of the spinner arm;
    (b) a swaged head formed at the first end of the swivel linkage having a diameter larger than the linkage hole; and
    (c) an eye formed in a substantially circular shape at the second end of the swivel linkage for connecting to the spinner blade.

16. The lure of claim 9 wherein both the first and second swivel ends are rotatably fixed substantially on the spinner axis.

* * * * *